United States Patent [19]
Forschirm

[11] Patent Number: 5,886,066
[45] Date of Patent: Mar. 23, 1999

[54] THERMOPLASTIC POLYMER COMPOSITION EXHIBITING IMPROVED WEAR

[75] Inventor: Alex Forschirm, Parsippany, N.J.

[73] Assignee: Hoechst Celanese Corporation, Warren, N.J.

[21] Appl. No.: 896,190

[22] Filed: Jul. 17, 1997

[51] Int. Cl.$^6$ ...................................................... C08L 59/00
[52] U.S. Cl. ......................... 523/200; 524/311; 524/318; 524/425; 524/512
[58] Field of Search .................................... 524/311, 318, 524/425, 512; 523/200

[56] References Cited

U.S. PATENT DOCUMENTS

| | | | |
|---|---|---|---|
| 4,126,593 | 11/1978 | Takahashi | 524/311 |
| 4,131,575 | 12/1978 | Adelmann | 524/311 |
| 4,960,813 | 10/1990 | Wadhwa | 524/311 |
| 5,162,412 | 11/1992 | Liu | 524/313 |
| 5,244,954 | 9/1993 | Fasulo | 524/311 |
| 5,314,912 | 5/1994 | Yoshitani | 524/458 |

*Primary Examiner*—Patricia A. Short
*Attorney, Agent, or Firm*—James M. Hunter, Jr.

[57] ABSTRACT

A low wear polymeric composition exhibiting improved surface wear resistance and coefficients of friction characterized as a melt blend of a thermoplastic polymer and a lubricating system containing PTFE, pentaerythritol tetrastearate and fine particle, stearate coated calcium carbonate, a hindered amine, N,N'-ethylene bis-stearamide, and calcium ricinoleate. The composition is suitable for the preparation of shaped articles for use in fricitional environments.

16 Claims, No Drawings

THERMOPLASTIC POLYMER COMPOSITION EXHIBITING IMPROVED WEAR

FIELD OF THE INVENTION

The present invention relates to thermoplastic polymer compositions with improved wear properties. The composition containing a thermoplastic polymer and lubricating system suitable for use as a molding resin to prepare shaped articles. Shaped articles prepared from the composition exhibit low friction properties as well as reduced surface wear under loads.

BACKGROUND OF THE INVENTION

Thermoplastic polymers, e.g. polyamides, polyesters, polyphenylene sulfide, polyoxymethylene, polyolefins, styrene polymers, and polycarbonates, are characterized as polymers that exhibit exceptional mechanical and electrical properties, as well as good moldability and chemical resistance. However, these polymers may exhibit inadequate tribological properties when utilized in some friction environments, e.g. plastic to metal, and plastic to plastic interfaces. While many lubricating compositions have been applied to thermoplastic polymers to improve friction and wear properties of shaped articles prepared therefrom, some applications prohibited the use of certain lubricants because of possible contamination, e.g. food handling, clothing preparation and volatile environments.

Attempts have been made to improve the friction properties and reduce the surface wear of articles prepared from thermoplastic polymers by incorporating lubricants directly into the polymer matrix prior to the fabrication of shaped articles therefrom Many materials, including solid lubricants and fibers (e.g. graphite, mica, silica, talc, boron nitride and molybdenum sulfide), paraffin waxes, petroleum and synthetic lubricating oils, and other polymers (e.g. polyethylene and polytetrafluoroethylene) have been added to thermoplastic polymers to improve friction and wear properties. However, the addition of many of these additives in various combinations to thermoplastic polymers, while improving tribological properties have reduced other desirable physical and mechanical properties. Some additives have proven satisfactory for short terms at low speeds and loads. However, fiction characteristics of many of these lubricants significantly deteriorate over long periods of time under increased loads.

There is a desire for a non-toxic, low wear thermoplastic compositions possessing surface wear resistance and low friction properties under increasing loads over long periods of time. A suitable composition, when fabricated into a shaped article, should maintain the desired mechanical and physical properties long associated with thermoplastic polymers, and be safely utilized in food handling and clothing manufacturing industries.

SUMMARY OF THE INVENTION

The present inventon relates to a low wear polymeric composition suitable for forming a low friction, shaped article, characterized as a melt blend of from about 70 to about 99.5 weight percent of a thermoplastic polymer, and from about 30 to about 0.5 weight percent of polytetrafluoroethylene, pentaerythritol tetrastearate (PETS), and fine particle, stearate coated calcium carbonate. Processing aids that do not detract from the characteristics of the invention may be added to the composition to enhance physical properties and processing, e.g. dispersion of the lubricating system within the polymer matrix.

The composition may be formed into low wear shaped articles, e.g. bearings, gears, cams, rollers, sliding plates, pulleys, levers, guides, conveyor links, etc., which exhibit good friction properties and are useful in numerous applications wherein parts exhibiting low friction and reduced wear properties are desirable.

DETAILED DESCRIPTION OF THE INVENTION

The invention is directed to a low wear polymeric composition which may be fabricated into shaped articles exhibiting good friction properties. Generally, the composition may be characterized as an admixture of from about 70 to about 99.5 weight percent of a thermoplastic polymer and from about 30 to about 0.5 weight percent of a lubricating system. Typically, the composition may contain from about 85 to about 99 weight percent of the thermoplastic polymer and from about 15 to about 1 weight percent of the lubricating system Preferbly, the composition contains about 98 weight percent of the thermoplastic polymer and about 2 weight percent of the lubricating system, based on the total weight of the composition.

Thermoplastic polymer useful in the low wear composition of the present invention may be, generally, selected from polyamides, polyesters, polyphenylene sulfides, polyolefins, polyoxymethylenes, styrene polymers, and polycarbonates. Particular preferred thermoplastic polymer of the invention is polyoxymethylenes, i.e. polyamic acetals or oxyunthylene polymers. Polyoxymethylenes exhibit physical and mechanical properties that make them suitable for many industrial applications.

Polyoxymethylenes, i.e. polyacetals or oxymethylene polymers useful in the present invention are generally characterized as having recurring oxymethylene units of the general formula:

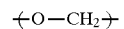

Polyoxymethylenes that are useful in making composition of the invention generally have a fairly high content of oxymethylene units, i.e. generally greater than about 85 percent. These materials are commercially available from a number of manufactures as homopolymers, copolymers, terpolymers and the like. These highly crystalline acetals, described briefly hereinbelow, are well known in the art and have been reviewed extensively. For example, a review of polymeric acetals entitled, "Acetal Resins," by T. J. Dolce and J. A. Grates, may be found in the Second Edition of Encyclopedia of Polymer Science and Engineering, John Wiley and Sons, New York, 1985, Vol. 1, pp. 42–61. Additional information on acetal polymers can be found in French Patent No. 1,221,148 as well as commonly assigned U.S. Pat. Nos. 3,027,352, 3,072,069, 3,147,234, and 3,210,318.

Typically, acetal homopolymers may be prepared by polymerizing anhydrous formaldehyde or trioxane. Oxymethylene homopolymers are typically stabilized against thermal degradation by end-capping with, for example, ester or ether groups, such as those derived from alkanoic anhydrides (e.g. acetic anhydride) or dialkyl ethers, (e.g. dimethyl ether) or by incorporating stabilizer compounds into the homopolymer. Commercially available acetal homopolymer is made by polymerizing anhydrous formaldehyde in the presence of an initiator after which the polymer is end-capped by acetylation of the hemiacetal end groups with acetic anhydride in the presence of sodium acetate catalyst. Methods for making end-capped acetal homopolymers are taught in U.S. Pat. Nos. 2,786,994 and 2,998,409. Acetal homopolymers are well know in the art and are commercially available under the trademarks Delrin® and Tenac®.

Polymeric acetals which have been found to be especially suitable for use in the composition of the present invention are crystalline oxymethylene copolymers having repeat units which consist essentially of oxymethylene groups interspersed with oxy(higher alkylene) groups of the general formula:

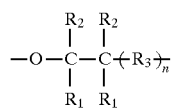

wherein each $R_1$ and $R_2$ is hydrogen, a lower alkyl group, or a halogen substituted lower alkyl group, each $R_3$ is a methylene, oxymethylene, lower alkyl or haloalkyl substituted methylene or lower alkyl or haloalkyl substituted oxymethylene group, and n is zero or an integer from one to three, inclusive. Each lower alkyl group preferably contains one or two carbon atoms. Oxymethylene groups generally will constitute from about 85 to 99.9 percent of the recurring units in such copolymers and are generally incorporated by ring-opening polymerization of trioxane in the presence of an acidic catalyst. The oxy(higher alkylene) groups are incorporated into the polymer by copolymerizing a cyclic ether or cyclic formal having at least two adjacent carbon atoms in the ring in addition to trioxane. The cyclic ether or formal is incorporated by the breaking of an oxygen-to-carbon linkage. The preferred oxy(higher alkylene) group is oxyethylene, having the formula:

Oxyethylene may be incorporated into the polymer by copolymerization of ethylene oxide or 1,3-dioxolane with trioxane.

The preferred crystalline acetal copolymers, as described above which have a structure consisting essentially of oxymethylene and oxyethylene groups, are thermoplastic materials having a melting point of at least 150° C. They normally are millable or processable at temperatures ranging from about 175° C. to about 230° C. These copolymers are normally highly crystalline and exhibit a polymer crystallinity from about 40 percent to about 90 percent or greater.

Typically, oxymethylene copolymers are stabilized after manufactured by degradation of unstable molecular ends of the polymer chains to a point where a relatively stable carbon-to-carbon linkage prevents further degradation of each end of the polymer chain. Such degradation of unstable molecular ends is generally effected by hydrolysis, as disclosed, for example, in U.S. Pat. No. 3,219,623 to Berardinelli. Oxymethylene copolymer may also be stabilized by end-capping, again using techniques well known to those skilled in the art, as for example by acetylation with acetic anhydride in the present of a sodium acetate catalyst.

A particularly preferred class of oxymethylene copolymers is commercially available under the trade name Celcon® acetal copolymer from Hoechst Celanese Corporation, Hoechst Technical Polymers. Celcon acetal copolymers typically are copolymers of about 98 weight percent of trioxane and about 2 percent of dioxolane. Celcon® is a trademark of Hoechst Celanese Corporation. The compositions of the current invention may be made using any commercial grade of Celcon acetal, including Celcon grades U-10, M-25, M-90™, M-270™ and M-450. Celcon M-25 acetal copolymer has a melt index of about 2.5 g/10 min when tested in accordance with ASTM D1238-82. Celcon M-90 acetal copolymer has a lower molecular weight and melt viscosity than Celcon M-25. Celcon M-270 has an even lower molecular weight and melt viscosity than Celcon M-25.

Oxymethylene terpolymers may also be used in making the low wear polymeric compositions of the present invention. These terpolymers contain oxymethylene groups, oxy (higher alkylene) groups such as those corresponding to the general formula:

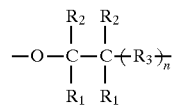

and a different third group which has been interpolymerized with the oxymethylene and oxy(higher alkylene) groups. A terpolymer as described above is typically made by reacting trioxane with a cyclic ether or cyclic acetal and a third monomer which is a bifunctional compounds, such as a diglycide of the formula:

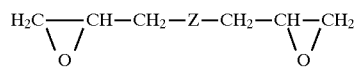

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples of suitable bifunctional compounds include the diglycidyl ethers of ethylene glycol, 1,2-propanediol, and 1,4-butanediol with the diglycidyl ether of 1,4-butanediol being preferred. Generally, when preparing such terpolymers, ratios of from 99.89 to 89.0 weight percent trioxane, 0.1 to 10 weight percent of the cyclic ether or cyclic acetal, and 0.01 to 1 weight percent of the bifunctional compound are preferred, based on the total weight of monomers used in forming the terpolymer. A particularly preferred oxymethylene terpolymer is commercially available from Hoechst Celanese Corporation, Hoechst Technical Polymers under the name Celcon U10 acetal polymer, made from 1,4-butanediol diglycidyl ether crosslinker, dioxolane and trioxane containing about 0.05 weight percent, 2.0 weight percent, and 97.95 weight percent, respectively, of repeating units derived from these three monomers, based on the total weight of the terpolymer. The oxymethylene-based terpolymers are made and stabilized by methods well known in the art, such as by the addition of antioxidants and formaldehyde and acid scavengers. More detailed descriptions of the methods for making oxymethylene-based terpolymers and their compositions can be found in previously cited patents.

These oxymethylene polymers may be combined in various proportions by melt blending in extruders or similar apparatus to form suitable polymers for preparation of the low wear composition of the present invention. Generally, polyoxymethylene polymers are readily blended with the lubricating system and processing aids when the polymer is in the molten state, i.e. at temperatures of at least about 170° C.

The lubricating system of the present invention may be characterized as containing a lubricating amount, sufficient to reduce friction and wear, of polytetrafluoroethylene (PTFE), pentaerythritol tetrastearate (PETS), and fine particle, stearate coated calcium carbonate. The components of the lubricating system may be blended together with the desired polymer to form the lubricating composition or separately to form a lubricating system package which subsequently may be combined with the desired polymer to produce a thermoplastic composition exhibiting low wear properties. Generally, the lubricating system may be characterized as containing at least about 0.5 weight percent of PTFE, at least about 0.25 weight percent of PETS, and at least about 0.25 weight percent of fine, particle, stearate coated calcium carbonate, based on the total weight of the composition. Typically, the lubricating system will contain from about 0.5 to about 5.0 weight percent of PTFE, from about 0.25 to about 2.0 weight percent of PETS, and from about 0.25 to about 2.0 weight percent of fine particle, stearate coated calcium carbonate, based on the total weight of the composition. Preferably, the composition will contain about 0.8 weight percent of PTFE, about 0.5 weight percent of PETS, and about 1.0 weight percent of fine particle, stearate coated calcium carbonate, based on the total weight of the composition.

Several additional components may be added to the composition of the present invention to aid lubricity and processing. Generally, the additives may be combined proportionally with the lubricating system and admixed as a package for addition to the thermoplastic polymer or they may be blended directly with the polymer. Generally, these additives may be selected from: (a) at least about 0.25 weight percent of a polyoxymethylene terpolymer; (b) at least about 0.1 weight percent of a hindered phenol; (c) at least about 0.05 weight percent of calcium ricinoleate; and, optionally, (d) at least about 0.1 weight percent of N,N'-ethylene bis-stearamide, based on the total weight percent of the composition. Typically, these additives may be admixed with the self-lubricating composition in amounts selected from: (a) from about 0.25 to about 2.0 weight percent of a polyoxymethylene terpolymer; (b) from about 0.1 to about 0.75 weight percent of a hindered phenol; (c) from about 0.05 to about 0.2 weight percent of calcium ricinoleate; and, optionally, (d) from about 0.1 to about 0.5 weight percent of N,N'-ethylene bis-stearamide, based on the total weight percent of the composition. Preferably, these additives are admixed with the composition in amounts of: (a) about 0.5 weight percent of a polyoxymethylene terpolymer; (b) about 0.5 weight percent of a hindered phenol; (c) about 0.1 weight percent of calcium ricinoleate; and, optionally, (d) about 0.2 weight percent of N,N'-ethylene bis-stearamide, based on the total weight percent of the composition. The addition of these processing aids will typically result in a concomitant adjustment in the amount of thermoplastic resin. Other processing aids known to those skilled in the art which do not detract from the improved wear properties of the composition, such as silicone and fluoropolymer mold sprays may be used to aid in mold release when preparing shaped articles.

A particular preferred polytetrafluoroethylene (PTFE) which meets FDA/USDA compliance, is Hostatlon® TF9203 distributed by Hoechst Celanese Corporation of Somerville, N.J. A preferred pentaerythritol tetrastearate (PETS) is Glycolube P® disributed by Lonza, Inc. The fine particle, stearate coated calcium carbonate useful in the invention is characterized as exhibiting a particle size of about 0.6 μm, a surface area of about 7 $m^2$/gm, a bulk density of about 25 lb/$ft^3$, and a specific gravity of about 2.7. A preferred fine particle, stearate coated calcium carbonate is Super-Pflex® 200 available from Pfizer, Inc. The hindered phenol useful in the present invention are generally known as antioxidants or free radical inhibitors. At least one of 2,2'-methylenebis(4-methyl-6-t-butylphenol), hexamethyleneglycol-bis(3,5-di-t-butyl-4-hydroxyhydrocinnamate), tetrabis[methylene(3,5-di-t-butyl-4-hydroxyhydrocinnamate)]methane, triethyleneglycol-bis-3-(3-t-butyl-4-hydroxy-5-methylphenyl)propionate, 1,3,5-trimethyl-2,4,6-tris(3,5-di-t-butyl-4-hydroxy-benzyl)-benzene, p-octadecyl-3-(4'-hydroxy-3',5'-di-t-butyl-phenol)propionate, 4,4'-methylenebis(2,6-di-t-butylphenol), 4,4'-butylidene-bis-(6-t-butyl-3-methylphenol), 2,2'-thiodiethyl-bis[3-(3,5-di-t-butyl-4-hydroxyphenol)]propionate, di-stearyl-3,5-di-t-butyl-4-hydroxybenzylphosphonate and 2-t-butyl-6-(3-t-butyl-5-methyl-2-hydroxybenzyl)-4-methylphenylacrylate may be used. However, the useful hindered phenols are not limited to these compounds. Other hindered or stereo-obstructing phenols of the same kind as the above described ones are effective. Of these, hexamethyleneglycol-bis(3,5-di-t-butyl-4-hydroxyhydrocinnamate), for example Irganox® 259 available from Ciba-Geigy, tetrakis[methylene(3, 5-di-t-butyl-4-hydroxyhydrocinnamate)]methane, for example Irganox 1010 made by Ciba-Geigy and triethyleneglycol-bis-3-(3-t-butyl-4-hydroxy-5-methylphenyl) propionate, for example Irganox 245 made by Ciba-Geigy are effective. A preferred hindered phenol is hexamethyleneglycol-bis(3,5-di-t-butyl-4-hydroxyhydrocinnamate). The N,N'-ethylene bis-stearamide useful in the invention is marketed under the trade name of Acrawax® C by Lonza, Inc.

The following examples are general illustrations of methods for preparing the polymeric composition of the invention. They are provided for purposes of exemplification only, as should be appreciated from the foregoing discussion.

EXAMPLE 1

To prepare a blend of the low wear polymeric composition, containing 3.4 weight percent, based on the total weight of the composition, of the lubricating system, the following components were utilized:

a) 96.1 wt. % of polyoxymethylene copolymer unstabilized flake;

b) 0.5 wt. % of polyoxymethylene terpolymer;

c) 0.8 wt. % of PTFE;

d) 1.0 wt. % of PETS;

e) 1.0 wt. % of calcium carbonate;

f) 0.1 wt. % of calcium ricinoleate; and g) 0.5 wt. % of preferred hindered phenol The components were tumbled in a barrel followed by high speed mixing for 30 sec. in a Henschel mixer to form a mixture. The mixture was fed into a Werner and Pfleiderer twin screw ZSK extruder and extruded into strands. The extruder zones were operated at 372° to 387° F., the melt temperature was 415° F. and under a vacuum of 27 in. Hg, and the screw speed was 150 rpm. Strands of extrudate were produced at a rate of 38 lbs/hr. Thereafter, the strands were quenched in cold water and cut into pellets. The pellets were injection molded at conventional pressure, velocity and cycle time settings, a nozzle temperature setting of 360° to 420° F., and barrel temperature setting of 350° to 420° F. to form 1.25 in diameter disks, each weighing about 7 gm, for mechanical and tribological analyses.

The disks were prepared for surface wear resistance and torque analyses by cleaning in a bath of isopropanol, drying in air, and weighing to about one-tenth (1/10) of a milligram. These disks were tested according to a Pin-on-Disk Wear Test. In performing the tests, a machined Nylatron pin with a spherical tip having a radius of 0.187 inches was mounted on the upper spindle of a Falex Friction and Wear Test Machine, Model Multi-Specimen at a distance of 0.469 inches from the center of the test disks, which was mounted on the lower spindle. A load of 20 pounds was applied to the test disks by means of an air cylinder which pressed the disk against the spherial pin tip. The rotational velocity was 425 rpm (104.3 ft/min). During the test, a stream of air at 40 standard cubic feet per hour (SCFH) and a distance of 2 inches from the disk was directed against the disk surface to remove debris. Testing times ranged from 0.5 to 65 hours. After testing, the pin tip and disk were separated from contact and the disk was removed, air brushed to remove loose debris, and weighed for weight loss, i.e., surface wear.

Torque ($\Gamma$), measured during the test, was converted into a coefficient of friction ($f$) by application of the equation:

$$f = \Gamma(2.137/20)$$

The factor 2.137 is a specific coefficient for this machine. Results of surface wear and coefficients of friction are in Table II.

EXAMPLE 2

In another example, a low wear composition was prepared containing 3.0 wt % polytetrafluoroethylene (PTFE) in the lubricating system, wherein the lubricating system comprised 4.6 weight percent of the composition, the following components were utilized:

Components
- a) 94.9 wt. % of polyoxymethylene copolymer unstabilized flake;
- b) 0.5 wt. % of polyoxymethylene terpolymer;
- c) 3.0 wt. % of PTFE;
- d) 0.5 wt. % of PETS;
- e) 0.5 wt. % of calcium carbonate;
- f) 0.1 wt. % of calcium ricinoleate; and
- g) 0.5 wt. % of preferred hindered phenol The components were mixed, extruded and molded according to the process of Example 1 to form 7 gm disks for weight loss and coefficient of friction analyses. Results of the analyses are in Table II

EXAMPLE 3

In another example, a low wear polymeric composition was prepared containing 3.0 wt. % of PTFE and 4.1 wt. % of the lubricating system the components were blended in accordance with Example 1, as follows:

Components
- a) 95.4 wt. % of polyoxymethylene copolymer unstabilized flake;
- b) 0.5 wt. % of polyoxymethylene terpolymer;
- c) 3.0 wt. % of PTFE;
- d) 0.25 wt. % of PETS;
- e) 0.25 wt. % of calcium carbonate;
- f) 0.1 wt. % of calcium ricinoleate; and
- g) 0.5 wt. % of preferred hindered phenol The components were mixed, extruded and molded according to the process of Example 1 to form 7 gm disks for weight loss and coefficient of friction analyses. Results of the analyses are in Table II.

To demonstrate the wear performance of the composition in the presence of a PTFE lubricating system containing no pentaerythritol tetrastearate and calcium carbonate, two (2) formulations were prepared in accordance with the method of Example 1, above, as follows:

COMPARATIVE EXAMPLE 4

Components
- a) 97.2 wt. % of polyoxymethylene copolymer unstabilized flake;
- b) 0.5 wt. % of polyoxymethylene terpolymer;
- c) 1.5 wt. % of PTFE;
- d) 0 wt. % of PETS;
- e) 0 wt. % of calcium carbonate;
- f) 0.1 wt. % of calcium ricinoleate;
- g) 0.5 wt. % of preferred hindered phenol; and
- h) 0.2 wt. % of N,N'-ethylene bis-stearamide

COMPARATIVE EXAMPLE 5

Components
- a) 95.7 wt. % of polyoxymethylene copolymer unstabilized flake;
- b) 0.5 wt. % of polyoxymethylene terpolymer;
- c) 3.0 wt. % of PTFE;
- d) 0 wt. % of PETS;
- e) 0 wt. % of calcium carbonate;
- f) 0.1 wt. % of calcium ricinoleate;
- g) 0.5 wt. % of preferred hindered phenol; and
- h) 0.2 wt. % of N,N'-ethylene bis-stearamide The weight percentages of the components of the compositions of Examples 1 through 5 are summarized in Table I. Comparative Examples 4 and 5 contain PTFE in the lubricating system, but do not contain PETS and calcium carbonate.

TABLE I

| Components | Example 1 | Example 2 | Example 3 | Comparative Example 4 | Comparative Example 5 |
| --- | --- | --- | --- | --- | --- |
| POM-Copolymer | 96.1 | 94.9 | 95.4 | 97.2 | 95.7 |
| POM-Terpolymer | 0.5 | 0.5 | 0.5 | 0.5 | 0.5 |
| PTFE | 0.8 | 3.0 | 3.0 | 1.5 | 3.0 |
| PETS | 1.0 | 0.5 | 0.25 | 0 | 0 |
| Calcium Carbonate | 1.0 | 0.5 | 0.25 | 0 | 0 |
| Calcium Ricinoleate | 0.1 | 0.1 | 0.1 | 0.1 | 0.1 |
| Irganox 259 | 0.5 | 0.5 | 0.5 | 0.5 | 0.5 |
| Acrawax C | 0 | 0 | 0 | 0.2 | 0.2 |

Results of wear testing of disks prepared from compositions containing PTFE, as the lubricating system, exhibited surface wear as well as coefficients of friction significantly higher than the invention. Whereas the lubricating system cotaining a combination of PTFE, pentaerythritol tetrastearate and calcium carbonate exhibited superior wear properties after several hours of testing. Table II illustrates the results of wear testing results for the examples. After 0.5 hours of pin-on-disk testing, the composition of Example 1 exhibited an average weight loss of 2.6 mg after 1.5 hours of wear testing, 17 mg of weight loss after 17 hours of wear testing, and 44.8 mg of weight loss after 65 hours of testing. Similarly, Example 2 exhibited 9 mg of weight loss after 1.5 hours of testing, and Example 3 exhibited 19.6 mg of weight loss after 1.5 hours of wear testing. However, Comparative Examples 4 and 5 exhibited more significant weight losses of 29 and 24.3 mgs, respectively, after 1.5 hours of wear testing.

TABLE II

| | Lubrication System, | Wt. Loss, mg. (Coefficient of Friction) | | |
|---|---|---|---|---|
| | | Test Time, hrs. | | |
| Example No. | wt % | 1.5 | 17 | 65 |
| 1 | 3.4 | 2.6 (0.075) | 17 (0.085) | 44.8 (**) |
| 2 | 4.6 | 9 (0.064) | 34 (0.12) | 70 (**) |
| 3 | 4.1 | 19.6 (0.11) | 78.1 (0.13) | ** |
| Comp. 4 | 1.5 PTFE | 29 (0.13) | 133 (0.15) | 181 (**) |
| Comp. 5 | 3.0 PTFE | 24.3 (0.12) | 120 (0.17) | 201 (**) |

**no data

I claim:
1. A low wear polymeric composition suitable for forming a low friction, shaped article comprising, a menblend of from about 70 to about 99.5 weight percent of polyoxymethylenes, and from about 30 to about 0.5 weight percent of a lubricating system comprising, polytetrafluoroethylene, pentaerythritol tetastearate, and fne particle, stearate coated calcium carbonate, based on the total weight of the composition.
2. The composition according to claim 1, wherein the polyoxymethylene is selected from the group consisting of:
 (i) oxymethylene homopolymers;
 (ii) oxymethylene copolymers comprising about 85 to about 99.9 percent oxymethylene repeat units interspersed with repeat units of the formula:

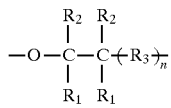

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;
 (iii) oxymethylene terpolmers, which are the reaction product of trioxane and, a cyclic ether and/or a cyclic acetal, and a diglycidyl ether crosslinker of the formula:

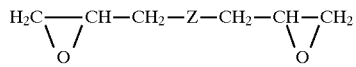

wherein Z is selected from the group consisting of a carbon-to-carbon bond, oxygen, an oxyalkoxy unit of 1 to 8 carbon atoms, and an oxypoly(lower alkoxy) unit; and
 (iv) mixtures of (i), (ii) and (iii).
3. The composition according to claim 2, comprising from about 85 to about 99 weight percent of the polyoxymethylene and from about 15 to about 1 weight percent of the lubricating system, based on the total weight of the composition.
4. The composition according to claim 3, wherein the lubricating system comprises at least about 0.5 weight percent of polytetrafluoroethylene, at least about 0.25 weight percent of pentaerythritol tetrasterate, and at least about 0.25 weight percent of fine, particle, stearate coated calcium carbonate, based on the total weight of the composition.
5. The composition according to claim 4, further comprising: (a) at least about 0.25 weight percent of a polyoxymethylene terpolymer; (b) at least about 0.1 weight percent of a hindered phenol; (c) at least about 0.05 weight percent of calcium ricinoleate; and, optionally, (d) at least about 0.1 weight percent of N,N'-ethylene bis-steararide, based on the total weight percent of the composition.
6. A shaped article prepared from the self-lubricating composition according to claim 5, exhibiting a weight loss of about 78.1 mg after 17 hours of wear at a revolutionary velocity of 104.3 ft/min and an applied load of about 20 1bs, and a coefficient of friction of about 0.13.
7. A method of improving the surface wear resistance of a thermoplastic shaped article, comprising the steps of:
 (a) preparing a melt blend composition, comprising from about 85 to about 99 weight percent of the polyoxymethylenes and from about 15 to about 1 weight percent of the lubricating system, wherein said lubricating system comprises polytetrafluoroethylene, pentaerythritol tetrasterate, and fine particle, stearate coated calcium carbonate; and
 b) fabricating said composition into a shaped article, wherein the article exhibits an improved coefficient of friction and surface wear resistance.
8. The method according to claim 7, wherein the polyoxymethylene is selected from the group consisting of:
 (i) oxyrethylene homopolymers;
 (ii) oxymethylene copolymers comprising about 85 to about 99.9 percent oxymethylene repeat units interspersed with repeat units of the formula:

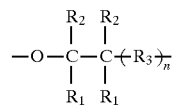

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;
 (iii) oxymethylene terpolymers, which are the reaction product of trioxane and, a cyclic ether and/or a cyclic acetal, and a diglycidyl ether crosslinker of the formula:

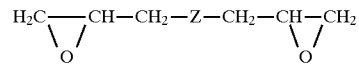

wherein Z is selected from the group consisting of a carbon-to-carbon bond, oxygen, an oxyalkoxy unit of 1 to 8 carbon atoms, and an oxypoly(lower alkoxy) unit; and (iv) mixtures of (i), (ii) and (iii).

9. The method according to claim 8, wherein the polyoxymethylene is oxymethylene copolymers comprising about 85 to about 99.9 percent oxymethylene repeat units interspersed with repeat units of the formula:

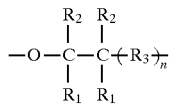

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower all and haloallyl-substituted oxymethylene radicals, and n is an integer from 0 to 3, inclusive.

10. The method according to claim 9, wherein the lubricating system comprises from about 0.5 to about 5.0 weight percent of polytetrafluoroethylene, from about 0.25 to about 2.0 weight percent of pentaerythritol tetrasterate, and from about 0.25 to about 2.0 weight percent of fine particle, stearate coated calcium carbonate, based on the total weight of the composition.

11. The method according to claim 10, wherein the lubricating system comprises about 0.8 weight percent of polytetrafluoroethylene, about 0.5 weight percent of pentaerythritol tetrasterate, and about 1.0 weight percent of fine particle, stearate coated calcium carbonate, based on the total weight of the composition.

12. The method according to claim 11, wherein the lubricating system further comprises: (a) from about 0.25 to about 2.0 weight percent of a polyoxymethylene terpolymer; (b) from about 0.25 to about 0.75 weight percent of a hindered phenol; (c) from about 0.05 to about 0.2 weight percent of calcium ricinoleate; and, optionally, (d) from about 0.1 to about 0.5 weight percent of N,N'-ethylene bis-stearamide, based on the total weight percent of the composition.

13. A shaped article prepared according to the method of claim 12 wherein the article exhibits a weight loss of about 34 mg after 17 hours of wear at a revolutionary velocity of 104.3 ft/min at an applied load of about 20 lbs, and a coefficient of friction of less than about 0.12.

14. The shaped article according to claim 13, wherein the article is selected from the group consisting of bearings, gears, cams, rollers, sliding plates, pulleys, levers, guides and conveyor belt links.

15. A low wear polymeric composition suitable for forming a low friction, shaped article comprising, polyoxymethylene and the lubricating system, comprising about 0.8 weight percent of polytetrafluoroethylene, about 0.5 weight percent of pentaerythritol tetrasterate, about 1.0 weight percent of fine particle, stearate coated calcium carbonate, about 0.5 weight percent of a polyoxymethylene terpolymer, about 0.5 weight percent of a hindered phenol, about 0.1 weight percent of calcium ricinoleate, and, optionally, about 0.2 weight percent of N,N'-ethylene bis-stearamide, based on the total weight percent of the composition, wherein the balance of the composition is polyoxymethylene selected from the group consisting of:

(i) oxymethylene homopolymers;

(ii) oxymethylene copolymers comprising about 85 to about 99.9 percent oxymethylene repeat units interspersed with repeat units of the formula:

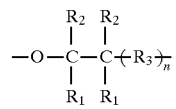

wherein each $R_1$ and $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals, and n is an integer from 0 to 3, inclusive;

(iii) oxymethylene terpolyrers, which are the reaction product of trioxane and, a cyclic ether and/or a cyclic acetal, and a diglycidyl ether crosslinker of the formula:

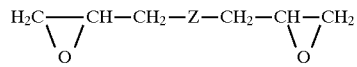

wherein Z is selected from the group consisting of a carbon-to-carbon bond, oxygen, an oxyalkoxy unit of 1 to 8 carbon atoms, and an oxypoly(lower alkoxy) unit; and (iv) mixtures of (i), (ii) and (iii).

16. A shaped article prepared from the composition according to claim 15, exhibiting reduce surface wear and a low coefficient of friction, wherein the article is selected from the group consisting of bearings, gears, cams, rollers, sliding plates, pulleys, levers, guides and conveyor belt links.

* * * * *